May 24, 1938.　　F. A. PARSONS ET AL　　2,118,357

MACHINE TOOL

Filed Feb. 26, 1936　　6 Sheets-Sheet 1

INVENTORS
Fred G. Parsons
Walter M. Pohl
BY Fred G. Parsons
ATTORNEY

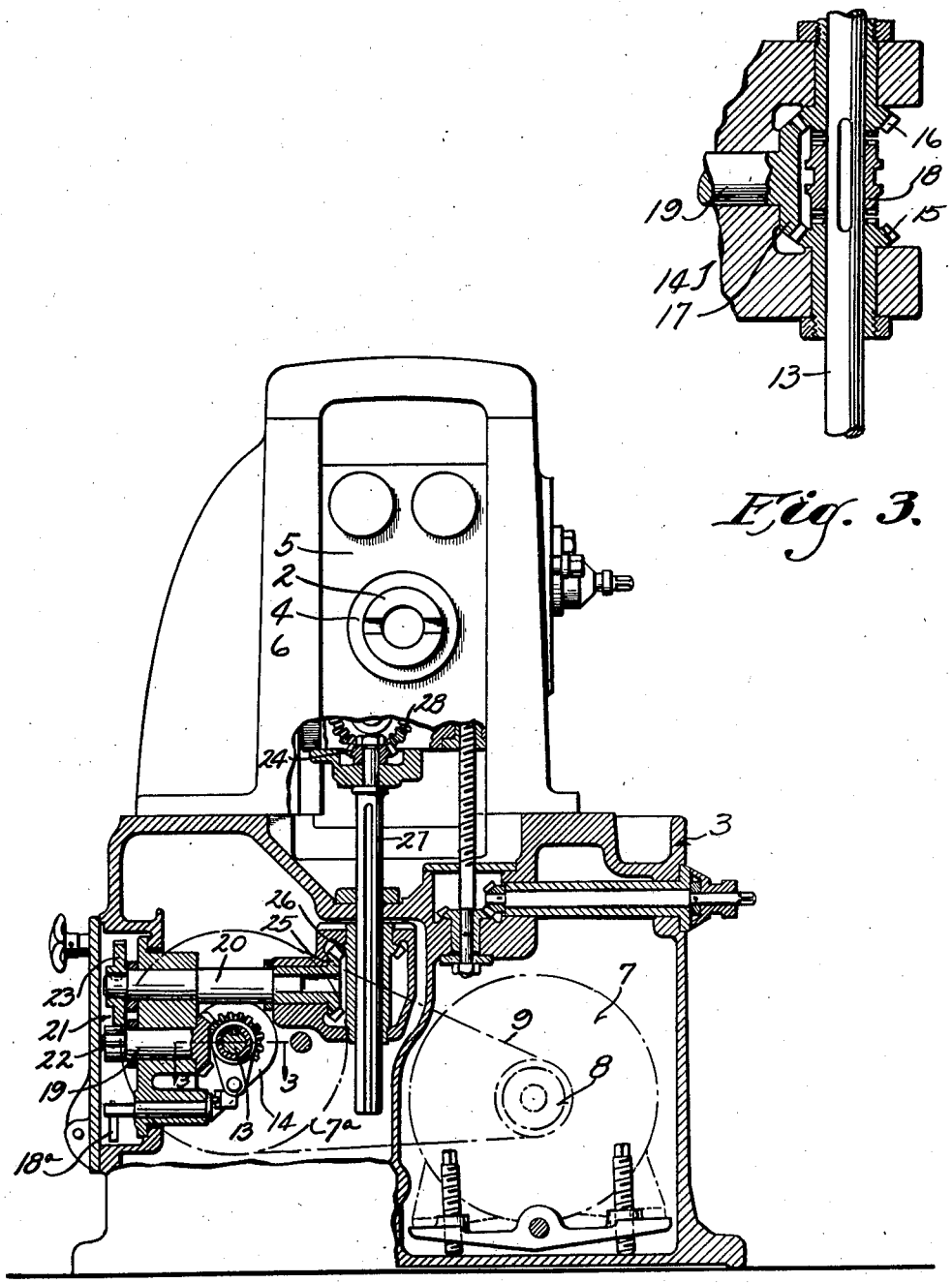

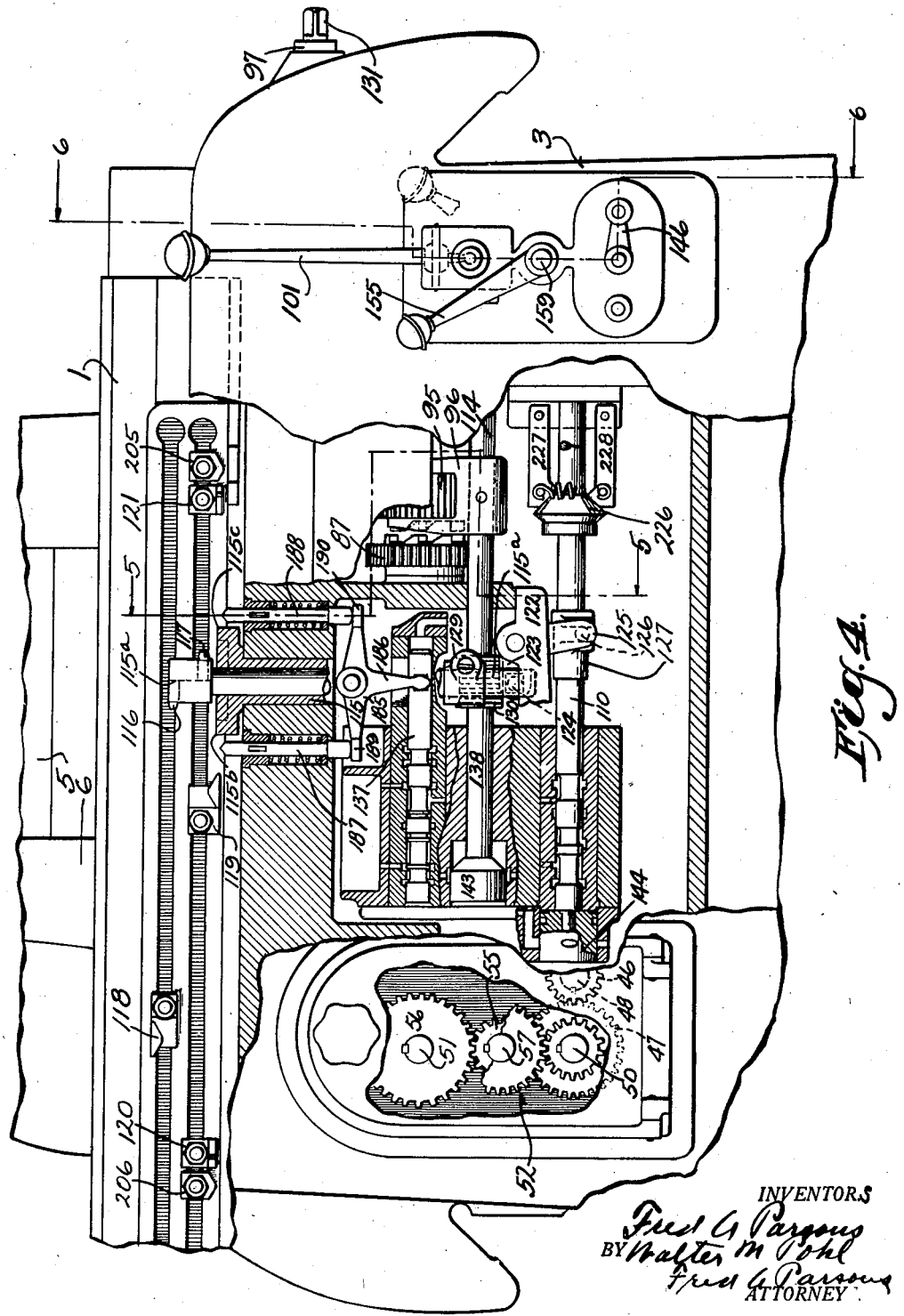

Patented May 24, 1938

2,118,357

UNITED STATES PATENT OFFICE 2,118,357

MACHINE TOOL

Fred A. Parsons, Milwaukee, Wis., and Walter M. Pohl, Washington, D. C., assignors to Kearney & Trecker Corporation, West Allis, Wis., a corporation of Wisconsin Application February 26, 1936, Serial No. 65,774

27 Claims. (Cl. 90—21)

This invention relates to machine tools and more particularly to a milling machine transmission and control mechanism.

An object of the invention is to provide an improved transmission mechanism and control therefor which may be used for either hand or automatic operation of a machine tool, or for movements involving both hand and automatic control, and particularly for a milling machine.

A particular object is to supplement the invention of a co-pending application Serial No. 36,766 filed August 19, 1935, Patent No. 2,077,434, April 20, 1937, with further inventions and improvements directed toward the same general type of machine tool transmission and control mechanism as is there shown and usable in combination therewith or supplementary thereto.

Further objects are to provide improved transmission and control mechanism including improved means for automatic reversal without use of lost motion mechanical snap-over devices; and including improved automatic reversing means, particularly as to the degree of accuracy in effecting reversal at a predetermined point of forward movement; and in which the direction and alternative feed or quick traverse rate are determined by separate and individually operable mechanisms, but the automatic control of direction is interrelated or interconnected in an improved manner with the control for alternative feed or quick traverse rate; and including interconnection or interrelation of the clutch control with other transmission and control mechanism of the machine, and especially where the direction and rate controls are interconnected; and a still further purpose is to provide some or all of such improved structure in a form particularly suited to use in a milling machine.

A further purpose is to provide an improved form of control mechanism at least in part hydraulically operated, particularly for some or all of the purposes herein mentioned, and especially where a part of the control mechanism of the machine is manually operated, and more especially for a milling machine.

A further purpose is generally to simplify and improve the construction and operation of machine tools, and particularly of milling machines, and especially for one or more of the purposes previously mentioned, and still other improvements and purposes will be apparent from the description and claims.

The invention consists in the construction and combination of parts as herein illustrated, described, and claimed, and in such modifications of the structure illustrated and described as are equivalent to the structures of the claims.

Figure 2 is a front elevation of the same machine, partly in section taken approximately along line 2—2 of Fig. 1.

Figure 3 is a partial section taken along line 3—3 of Fig. 2 and enlarged.

Figure 4 is an enlarged partial front view of the same machine, with portions of the supporting structure broken away to show some of the interior mechanism.

Like parts are identified by the same reference characters throughout.

Figure 1:
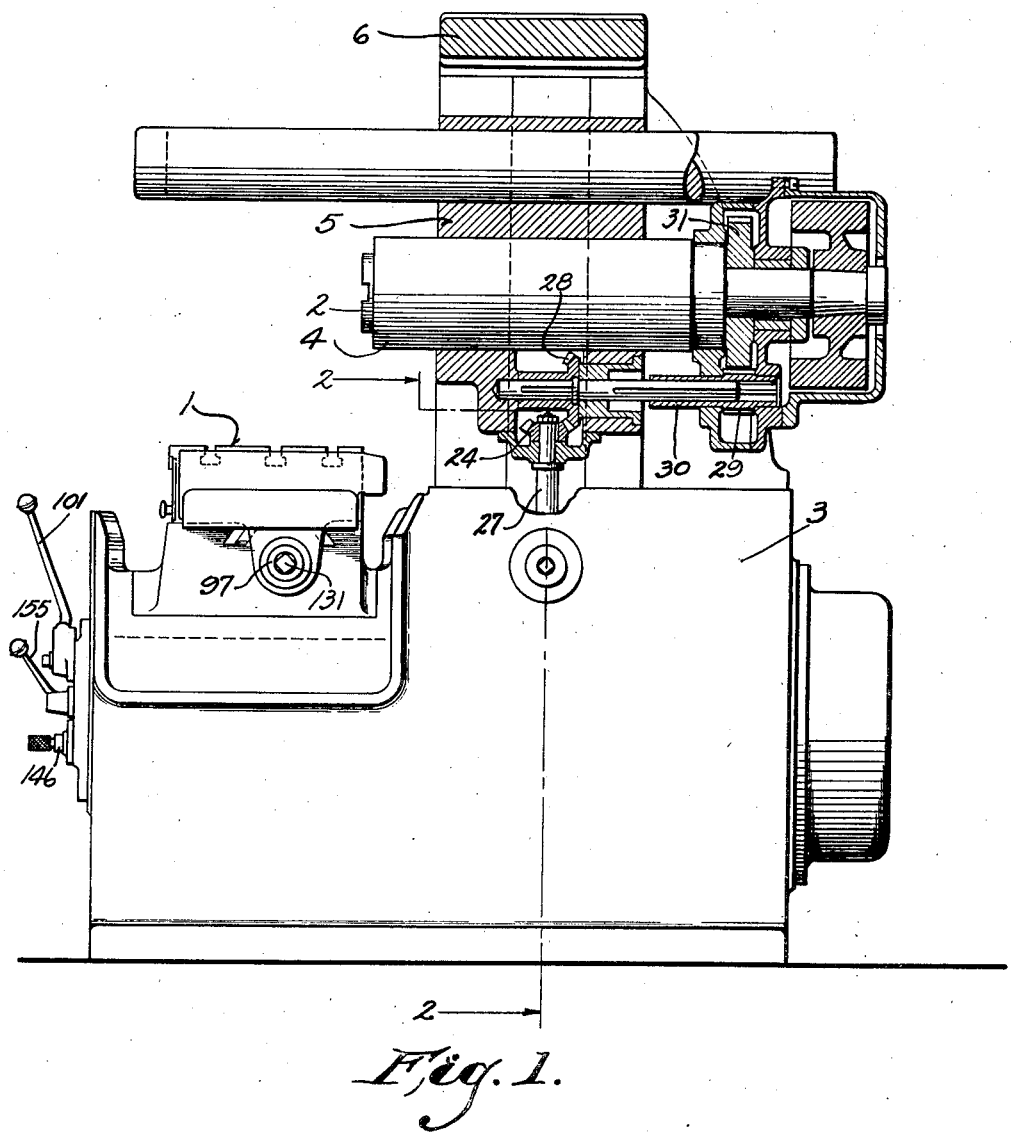
Figure 1 is a right side elevation, partly in section, of a milling machine incorporating the invention.

The machine here shown to illustrate the invention is a milling machine of the type having a fixed height reciprocatory work support or table 1 and a bodily vertically movable and rotatable tool spindle 2. A bed or base 3 supports spindle 2 and table 1, the spindle being journaled in a transversely movable quill member 4, which is guided in a vertically movable carrier member 5. Carrier 5 is guided in a supporting structure 6 in any suitable manner. Both members 4 and 5 may be adjusted and locked or clamped in various positions of their adjustment by any suitable adjusting and clamp means, not shown.

Figure 7:
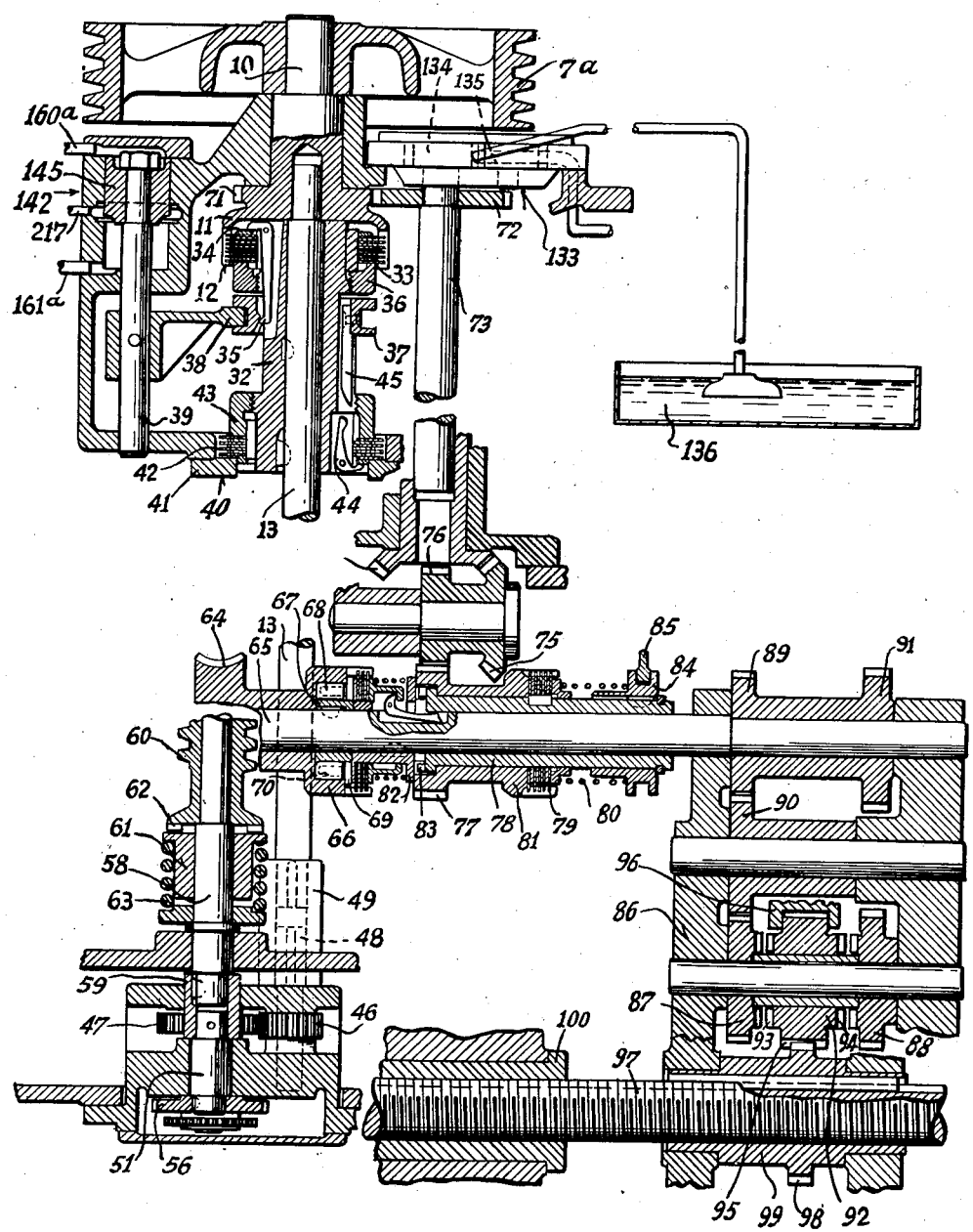
Figure 7 is a semi-diagrammatic development of certain transmission mechanism and some of the control mechanism of the machine.

A transmission is provided for rotation of spindle 2, as follows: A motor 7, Fig. 7, is housed in base 3 and drives a pulley 7a through a pulley 8 and belt means 9. Pulley 7a is fixed at one end of a shaft member 10, Fig. 7, at the other end of which is fixed the driving element 11 of a multiple plate friction type main clutch generally denoted by the numeral 12. When clutch 12 is engaged a shaft 13 is driven from motor 7. At an intermediate point shaft 13 carries a spindle reverser generally denoted by numeral 14, Figs. 2, 3 which comprises bevel gears 15, 16, 17, and a clutch member 18 manually engageable by a hand lever 18a, Fig. 2, to drive gear 17 in either direction. The driven gear 17 is fixed on a shaft 19 and drives a shaft 20, Fig. 2, through a spindle rate changer generally denoted by the numeral 21 and comprising a plurality of sets of interchangeable and reversible gear pairs such as gears 22, 23. The shaft 20 drives a bevel gear 24, Figs. 1, 2, vertically movable with the spindle carrier 5, through bevel gears 25, 26 and a vertical spline shaft 27, the gear 25 being fixed on shaft 20, and gear 26 slidably keyed with shaft 27. A bevel gear 28, Fig. 1, meshes with gear 24 and drives a pinion 29 through an extensible coupling 30, the pinion 29 meshing with a gear 31 fixed on tool spindle 2.

The main clutch 12 includes driving member 11, Fig. 7, a driven member 32 fixed with shaft 13 and the friction plates 33 which are alternatively keyed with the driving and driven members and slidable into mutual friction engagement. An abutment plate 34 may be shifted by a lever 35 to force the friction plates together and against an abutment 36 which is adjustable on member 32 to compensate for wear. The lever 35 is operated from a clutch spool 37 to engage or to release clutch 12, the spool 37 being shiftable by the means of a fork or shifter 38 fixed on a shifter rod 39 which is selectively movable by means later described.

A brake, generally denoted by the numeral 40, Fig. 7, is operative on shaft 13 and on the transmission driven therethrough, in the clutch releasing position of the main clutch 12. Brake 40 comprises an abutment 41 fixed with bed 3, mutually engageable friction plates 42, an adjustable abutment 43 and a lever 44 which is shifted to engage the brake upon the clutch releasing movement of shifter spool 37, by the means of a member 45 fixed to move with the spool.

A feed rate train for table 3 is driven through main clutch 12 from shaft 13, which extends forward and drives a gear 46, Figs. 4, 7, meshing with a gear 47, the gear 46 being fixed on a shaft 48 coaxial with shaft 13 and driven therefrom through a splined coupling 49. Gear 47 is fixed on a shaft 50, Fig. 4, which drives a shaft 51, Figs. 4, 7, through a feed rate changer generally denoted by the numeral 52, Fig. 4, and comprising a plurality of interchangeable and reversible gear pairs such as gears 55, 56, the driving and driven gears being removably keyed with shafts 50 and 51 respectively, and the intermediate gears being each removably keyed on a shaft 57. Shaft 51 drives a coaxial shaft 58, Fig. 7 through a coupling member 59. A worm 60 is rotatably mounted on shaft 58, but is normally driven at shaft speed through an overload release device comprising a member 61 having angular faced end teeth pressed into engagement with complementary clutch teeth 62 on the end face of the worm. In the event of overload the member 61 is forced back against the resistance of a spring 63 to disengage the clutch teeth, engaging again as the load is reduced. Worm 60 engages a worm wheel 64, Fig. 7, rotatable on a shaft 65, the worm wheel being fixed with an outer driving member 66 of an over-running clutch device having an inner driven cam member 67 fixed on shaft 65, and having a plurality of driving rollers 68 intermediate between the outer and inner members 66, 67, and operative in the usual manner to drive shaft 65 from worm wheel 64 and member 66, except when the shaft is itself driven by other means at a rate faster than the rate of member 66. An annular member 69 has side projections 70 interposed as spacers between the rollers 68.

A rapid traverse train for table 1 is driven from the motor 7 exclusive of the main clutch 12. This train includes shaft 10, Fig. 7, the meshed gears 71, 72, shaft 73, meshed bevel gears 74, 75, and meshed gears 76, 77. Gear 77 is rotatably mounted on a sleeve 78 which in turn is rotatably mounted on shaft 65, sleeve 78 being normally driven at a relatively fast or rapid traverse rate through an overload device which includes mutually engaging friction discs 79 and a spring 80 continuously urging the discs into friction engagement, the alternate discs being keyed to the extended hub 81 of gear 77, and to sleeve 78. The shaft 65, which is normally driven at feed rate through the overrunning clutch as previously explained, may be alternatively driven at quick traverse rate from sleeve 78 through a clutch member 82 which is fixed on shaft 65 and provided with end teeth adapted for engagement by complementary clutch teeth 83 on the end of sleeve 78, the sleeve 78 being axially shiftable by the means of an annular spool 84 and a shifter fork 85, to engage or disengage the clutch teeth. When the sleeve 78 is in the position disengaging the clutch teeth the feed train drives shaft 65 through the overrunning clutch member 69 and when the sleeve 78 is in the other, or clutch-engaged, position the rapid traverse train drives the shaft 65.

Shaft 65 drives table 1 through a table train comprising a reverser generally denoted by the numeral 86, Fig. 7, which includes oppositely running gears 87, 88, respectively driven from a gear 89 through an intermediate gear 90, and from a gear 91 which meshes directly with the gear 88 although shown separated in the development of Fig. 7. The reverser 86 includes a clutch member 92 having teeth 93, 94 respectively at its opposite ends and adapted to engage complementary clutch teeth on the faces of the gears 87, 88. A gear 95 is fixed on clutch member 92 and is engaged by a shifter fork 96 for shifting the clutch member. Gear 95 drives a table screw 97 through a gear 98 fixed on a sleeve 99, which is slidably keyed with the screw, the screw being journaled to move with the table 1 in the usual manner and engaging a nut 100 fixed with bed 3. The reverser clutch member 92 may be engaged for either direction of table movement or shifted to an intermediate position to stop the table by means later described.

Figure 5:
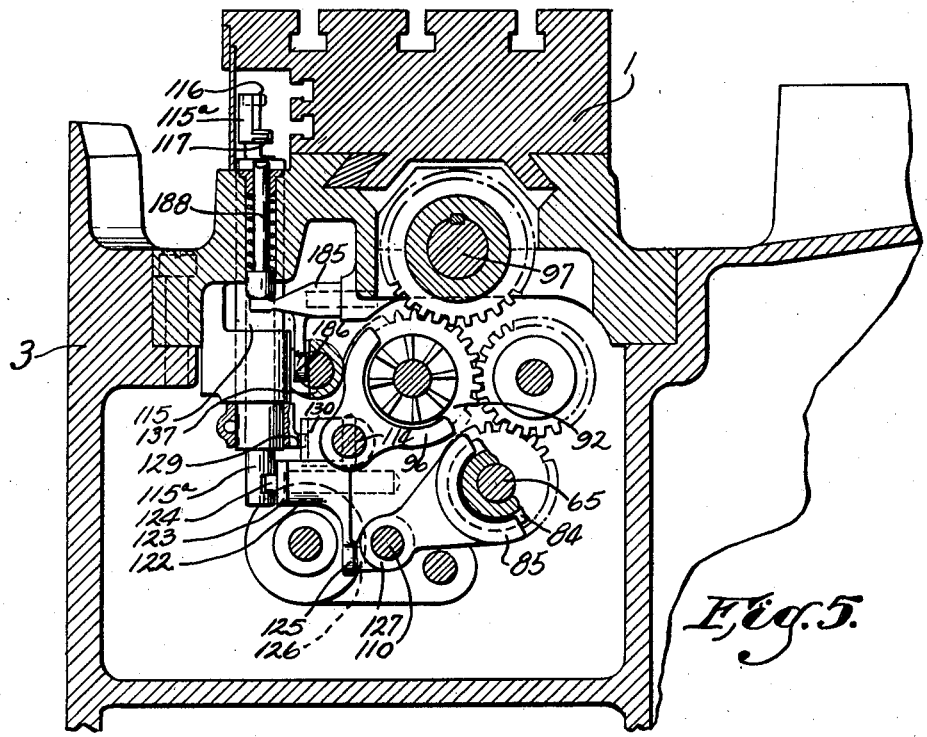
Figure 5 is a partial vertical section taken approximately along line 5—5 of Fig. 4.
Figure 6:
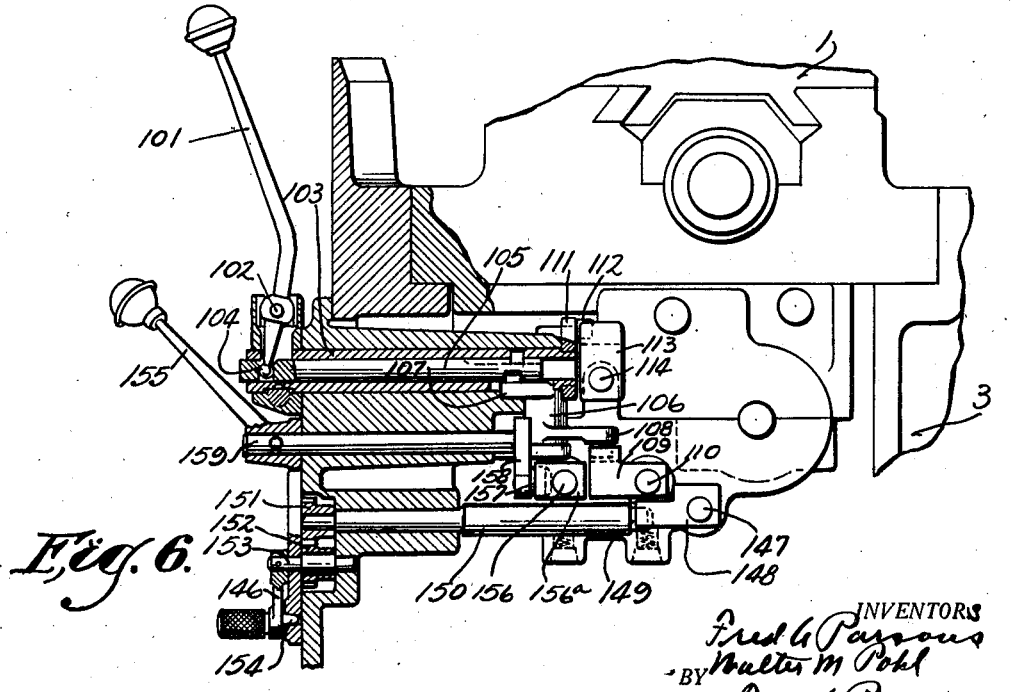
Figure 6 is a partial vertical section taken approximately along line 6—6 of Fig. 4.

For manual shifting of the feed and rapid traverse clutch fork 85, Fig. 7, and of the reverser clutch fork 96, Fig. 7, there is provided a hand lever 101, Figs. 1, 4, 6. Lever 101 is mounted for universal movement, either to right or left in Fig. 4, or in and out in Fig. 6, the lever oscillating about either of two pivots, one being a pivot pin 102, Fig. 6, and another being the axis of a rotatable sleeve 103, which carries the pivot pin 102. The in and out movement of lever 101 is connected for the movement of feed and quick traverse shifter fork 85 by the means of the lever end 104, a shifter rod 105, Fig. 6, axially movable in a bore in sleeve 103, a lever 106 having arms 107, 108, and a member 109 fixed on a shifter rod 110, upon which the shifter fork 85 is also fixed as shown in Fig. 5.

The right and left movement of lever 101 is connected for the movement of reverser shifter fork 96 by the means of pin 102 and lever end 104, Fig. 6, sleeve 103, a member 111 fixed on the end of the sleeve, a pin 112, and a member 113 engaged by pin 112 and fixed on a shifter rod 114, upon which the shifter fork 96 is also fixed as shown in Figs. 4, 5.

For dog operated shifting of the feed and rapid traverse clutch fork 85, and of reverser clutch fork 96 there is provided a dog operable sleeve member 115, Figs. 4, 5 which may oscillate on a vertical axis and a control post 115a which is slidably keyed with the sleeve for vertical movement. Post 115a is provided with lugs or elements 116, 117 respectively at an upper and lower level and of a form and position to be operated upon by an upper line of dogs such as dog 118, Fig. 4, when the table 1 is moving to the right in Fig. 4, and by a lower line of dogs such as dog 119 when the table is moving to the left, such dogs, of suitable form, being used to shift the post up or down axially. Sleeve 115 is provided with dog abutment members 115b, 115c, and there are other dogs, such as 120, 121, Fig. 4, which respectively contact the abutments 115b, 115c during right and left hand table movements to turn the sleeve and post in opposite directions. The various dogs are provided with suitable angular contact surfaces to effect the described movement during the travel of the table.

The vertical movement of post 115a is connected to shift the feed and quick traverse shifter fork 85 by the means of a pivoted lever 122, Figs. 4, 5, having an arm 123 carrying a pin 124 engaging the lower end of post 115a, and an arm 125 carrying a pin 126, which engages a slot in a member 127, which is the hub of feed and quick traverse shifter fork 85.

The oscillatory movement of sleeve 115 is connected to shift the reverser shifter fork 96 by the means of a segment member 129, Figs. 4, 5, fixed on sleeve 115 and having gear teeth engaging with suitable rack teeth on a member 130, which is fixed on the shifter rod 114 on which reverser shifter fork 96 is also fixed.

The various connections of the control post to the hand lever 101 and to the shifter forks 85, 96 is such that when the hand lever is moved to cause table travel to the right in Fig. 4, the resulting oscillation of post 115a turns the lug 117 to a position to be operated upon by the lower line of dogs such as 119, and turns the lug 116 out of dog contacting position, as indicated in Fig. 5. Similarly, table movement to the left brings lug 116 to position to be operated upon by the upper line of dogs such as 118, and turns lug 117 out of dog contacting position. Each direction of table movement may, therefore, be dog controlled without regard for the dogs controlling the other direction.

The dogs 120, 121 are primarily used for stopping the table, there being supplemental means provided to effect automatic reversal, as will be later explained. These dogs are, therefore only of such height as will return sleeve 115 and post 115a to their central position of oscillation, which corresponds to the disengaged position of reverser clutch member 92. In this position neither of the lugs 116, 117 or abutments 115b, 115c project sufficiently to be contacted by any of the dogs, and the table can, therefore, be manually moved, as desired, by the means of a suitable crank, not shown, applied to the squared end 131, Fig. 4, of the feed screw 97. But the contact of abutments 115b or 115c with the one or the other of dogs 120, 121 after a table stop prevents manual operation of lever 101 for engaging reverser clutch member 92 in its previous direction, thereby preventing the operator, after a dog-effected stop, from inadvertently power traversing the table too far. The lever 101 can, however, be immediately operated to effect reverse movement because the stop dog does not interfere with further manual movement of the sleeve in the same direction of rotation to effect reversal.

The shifter fork 38 for main clutch 12 and brake 40; the shifter fork 85 for alternative feed or quick traverse; and the reverser shifter fork 96 may each be hydraulically operated, and are interconnected and interdependent to some extent and for certain purposes, as will now be described.

Figure 8:
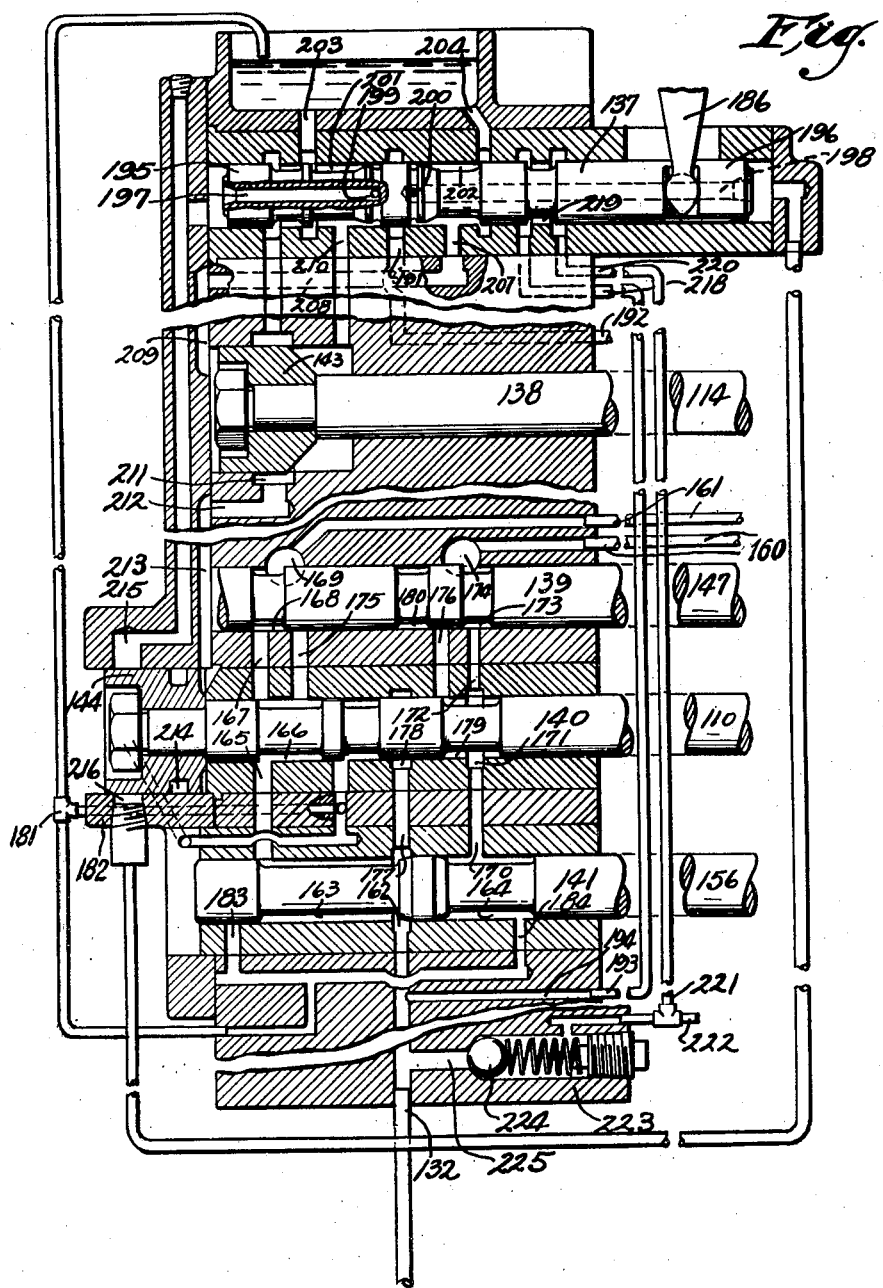
Figure 8 is a semi-diagrammatic development of certain of the control mechanism of the machine.

Fluid for operations just mentioned and for the lubrication of the machine, is continuously supplied to a channel 132, Fig. 8 from a suitable source of fluid pressure, such as a pump generally denoted by the numeral 133, Fig. 7. Pump 133 includes the impeller gears 134, 135 continuously driven through the gears 71, 72 and shaft 73, and draws fluid from a reservoir in the base 3, diagrammatically indicated at 136, Fig. 7. The fluid from channel 132 is delivered to various control devices through control valve mechanism including valves generally denoted by the numerals 137, 138, 139, 140, 141, Fig. 8, and 142, Fig. 7, the valves 138, 140, 142 being respectively associated for movement with the extended ends of the reverser shifter rod 114, Fig. 8 the feed and rapid traverse shifter rod 110, Fig. 8 and the main clutch shifter rod 39, Fig. 7. Also associated for movement with the several shifter rods are pistons 143, 144, 145 for shifting the respective rods in accordance with the supply of fluid thereto from the valves.

The main clutch 12 and brake 40 may be operated from the control valves either independently of the position of the feed and quick traverse clutch shifter rod 110, or alternatively in a manner such that whenever the quick traverse train is engaged to drive the table 1 then the main clutch 12 is disengaged, and brake 40 is operative, and whenever the feed train is engaged to drive the table 1 then the main clutch 12 is engaged. Selection of the one or the other action is effected by manually positioning the valve 139 to right or left in Fig. 8, by the means of a hand lever 146, Figs. 4, 6, the valve stem being extended to connect with a shifter rod 147, Figs. 6, 8, upon which is fixed a member 148 which is slotted to engage the eccentric end 149 of a shaft 150 which is connected by the gears 151, 152 to the shaft 153 upon which hand lever 146 is mounted, the lever being provided with a spring pressed detent plunger 154 to retain it in its different positions. When the valve 139 is in the position shown in Fig. 8 the control of the main clutch 12 is independent of the position of the feed and quick traverse clutch rod 110, and the control of main clutch 12 and brake 40 is then entirely dependent upon the position of valve 141, which may be shifted by the means of a hand lever 155, Figs. 4, 6, the valve stem being extended to provide a shifter rod 156, Figs. 6, 8, upon which is fixed a member 156a slotted to engage a pin 157 carried by a lever 158 fixed on the end of a shaft 159 upon which hand lever 155 is also fixed. In the position of valve 139 just mentioned, the fluid from channel 132 is supplied to the one or the other of the channels 160, 161, Fig. 8, which are respectively connected to the channels 160a, 161a, Fig. 7, whereby to shift piston 145 in the one or the other direction, the course of the fluid through the valves being as follows.

Port 162 of valve 141 may supply fluid to either annular valve groove 163, 164 according to the position of valve 141 as determined by hand lever 155. In the position of valve 141 shown in Fig. 8 the fluid passes to the channel 161 through channels and grooves 163, 165, 166, 167, 168, 169. In the other position of valve 141, to the left of its position in Fig. 8, the fluid passes to channel 160 through channels and grooves 164, 170, 171, 172, 173, 174.

The arrangement is such that if valve 139 is in the position shown in Fig. 8, the connections just described are obtained in either position of the feed and quick traverse shifter rod 110 and valve 140. But if the valve 139 is in its other position, to the right in Fig. 8 the action is different. In such case the fluid can reach channels 160 and 161 only through other channels 175, 176. Channels 175, 176 are so related to the grooves of valve 140 that when the feed and quick traverse shifter rod 110 is in the position shown in Fig. 8, which is the feed position, then, if valve 139 is in the position just stated, fluid may pass to the channel 161 through the grooves and channels 165, 166, 175, 168, 169, whereby to engage main clutch 12, but if the shifter rod 110 and valve 140 is in its other, or quick traverse position, to the left of the position shown in Fig. 8, then fluid will pass instead to the channel 160 through the grooves and channels 162, 177, 178, 179, 176, 180, 174, whereby to disengage the clutch 12 and engage brake 40.

It will be noted that the clutch disengaging effect just mentioned is not dependent upon the position of valve 141 and lever 155, since the fluid passes around the valve 141 through the exterior groove 162. On the contrary, the clutch engaging effect just mentioned may occur only when the valve 141 is in the position shown in Fig. 8, and then only if the valve 140 is in feed position. The result of the arrangement is that, when the valve 139 is in its automatic spindle stop position, to the right of the position shown in Fig. 8, a change from feed to quick traverse drive for the table will stop rotation of the tool spindle 2 irrespective of the position of hand lever 155 and valve 141, but the shifting of the feed and quick traverse shifter rod 110 and valve 140 to feed position will not start rotation of spindle 2 unless the hand lever 155 and valve 141 is in clutch engaged position. But since the feed train as well as the spindle train is derived through the clutch 12, as previously described, the table cannot move at a feed rate until the lever 155 and valve 141 is shifted to engage clutch 12 and start spindle 2, even though the shifter rod 110 and valve 140 is positioned to engage the feed train at its table end.

In each of the connections just described of the channel 132 to the clutch shifter channels 160 or 161 the other channel is connected to a drain pipe 181 through the one or the other of drain channels 182, 183, 184, whereby to permit the clutch piston 145 to shift, but since these drain connections may be readily perceived in Fig. 8, the various interconnecting channels will not be recited in detail.

The table reverser shifter rod 114 may be hydraulically shifted from the one to the other position of engagement of reverser 86 through the intermediate disengaged position, but only when the valve 137 is properly positioned for this purpose. Hydraulic shifting is not necessary or desirable for manual control of the reverser 86 from lever 101, being required only for automatic reversal of the table 1 at the end of a table stroke. Valve 137 has three positions, namely, the normal or central position, as shown in Fig. 8, a position to the right in Fig. 8, which will effect reversal from right hand to left hand table movement as later described, and a position to the left in Fig. 8, which will effect reversal from left hand to right hand table movement. Valve 137 is normally retained in its central position by the means of a pivoted lever 185, Fig. 4 having an arm 186, Figs. 4, 8 engaging a suitable slot in the stem of valve 137, and retained in central position by a pair of spring plungers 187, 188 acting on other arms 189, 190 of the lever 185 as shown in Fig. 4. In this central position of valve 137 a fluid channel 191, Fig. 8 which communicates with supply channel 132 through channels, 192, 193, 194, is cut off by the valve body.

The ends 195, 196 of valve 137, Fig. 8, are enclosed to operate as pistons respectively receiving fluid through axial channels 197, 198 and the transverse channels 199, 200 but only when the valve 137 has been shifted out of central position sufficiently to bring one of the valve grooves 201 or 202 into communication with the channel 191, the other of the grooves then communicating with one of the drain channels 203 or 204 to permit the valve 137 to be shifted. An initial movement of valve 137, sufficient to admit fluid from channel 191 to one end of the valve through channel 197 or 198, is effected by the one or the other of table dogs 205 or 206, Fig. 4 operating on the exposed upper ends of the spring plungers 187, 188, the arrangement being such that in either direction of table travel the movement of valve 137 thus originated by the dog will be in a direction to effect reversal to the other direction, as follows:

As soon as the pressure fluid is admitted to the one or the other valve end 195 or 196, the valve 137 is instantly shifted by fluid pressure, which then overcomes the springs operating on plungers 187, 188, Fig. 4, and as the valve 137 moves the channel 191 is connected by the valve ports to the one end or the other of reverser piston 143. Thus the movement of valve 137 to the left in Fig. 8 supplies fluid to the left end of reverser piston 143 through the grooves and channels 191, 202, 207, 208, 209; and movement of valve 137 to the right in Fig. 8 supplies fluid to the right end of reverser piston 143 through the grooves and channels 191, 201, 210. In each instance the other end of the piston 143 is connected to the one or the other of the drain channels 203 or 204, through channels which will be apparent in Fig. 8, and therefore will not be described.

When an automatic reversal of table movement is effected, as just described, it is desirable, in order to save time and for other reasons, that the table shall start its reverse movement at rapid traverse rate, irrespective of whether the forward movement was at feed or rapid traverse rate. In many instances the cutter is still cutting up to the instant when reversal takes place, and since a rapid traverse while the cutter is in contact with the work might damage the work or cutters it is necessary that any change from forward feed rate to quick traverse rate at the time of reversal should not take place until after forward movement has ceased.

In order to insure that the automatic reverse, irrespective of forward rate, always starts reverse movement at quick traverse rate, the feed and quick traverse shifter rod 110 is connected for movement with the piston 144, Fig. 8 and fluid is supplied to the right hand end, Fig. 8 of this piston to force the rod 110 to quick traverse position each time the valve 137 and reverser piston 143 are operated to effect automatic reversal from either direction of table movement. The supply of fluid for shifting piston 144 is derived from the reverser piston 143, which, after piston 143 has substantially completed its movement for reversal, opens the pressure supply channel 209 or 210, as the case may be, through the cylinder of piston 143 to a groove or channel 211, which communicates with the right hand end Fig. 8, of piston 144 through the channels 212, 213. The result is that, irrespective of the direction of movement of reverser piston 143, and irrespective of the position of feed and quick traverse piston 144 before reversal, the completion of reverse movement always finds the piston 144 in quick traverse position, but the arrangement insures that the change in rate shall not take place during forward movement.

Immediately after automatic reversal is fully effected, as described, including the change from feed to quick traverse rate in instances where the forward movement was at feed rate, the valve 137 is automatically returned to central position. This is effected as follows: When the piston 144 has been shifted to quick traverse position at the completion of automatic reversal, as just described, then the two ends 195, 196 of valve 137 are interconnected to relieve the unbalanced hydraulic pressure previously operating to force valve 137 out of central position. Such interconnection then exists through a channel groove 214, Fig. 8, in the piston 144, which then connects together the ends of two channels 215, 216, respectively connecting with the opposite ends 195, 196 of the valve 137. Immediately following such interconnection and consequent relief of unbalanced hydraulic pressure on valve 137 the spring plungers 187, 188, Fig. 4, return valve 137 to intermediate position as previously described.

It may be noted that if piston 144 and rod 110 are already in quick traverse position at the time reverse movement starts, then the valve 137 will not be shifted by hydraulic fluid as above described, because the ends of the valve will already be interconnected through the channels 214, 215, 216 whereby no unbalanced hydraulic pressure can be applied to shift the valve. In such case, however, the table 1 and dog 205, or 206, Fig. 4, will be moving at quick traverse rate and the dogs, operating through the plungers 187 or 188 will shift valve 137 to effect reversal substantially as quickly as if the valve 137 were moved hydraulically. Such reversal is not as accurate as that effected in the manner previously described, but extreme accuracy in reversal is not important when the forward movement is at quick traverse rate.

When valve 137 is in central position the various channels leading to the ends of valve 137, to piston 143, and to piston 144 are all connected to the one or the other of the drain pipes 203, 204, leaving the pistons free to be shifted by the manual controls previously described. These connections to the drains are apparent in Fig. 8 and therefore will not be described in detail.

In the machine as here shown the same pump 133 is used to supply fluid both for shifting and for lubrication. It is however preferable that the pressure available for shifting should be high relative to the lubricating pressure. Means are therefore provided to effect a high pressure, but only during shifting, thereby avoiding power waste and heating, as follows:

The shifter piston 145, Fig. 7, always stands in the one or the other position corresponding to an engaged clutch 12 or engaged brake 40, and from the previous description it will be apparent that the one or the other of the channels 160a, 161a leading to piston 145 is always open to receive fluid from channel 132, Fig. 8, through the channels and grooves leading through the valves 139, 140, 141. After the piston 145 has moved in accordance with the position of the valves, then a channel 217, Fig. 7 is opened to receive fluid from the one or the other channel 160a or 161a. The fluid from channel 132, Fig. 8 may therefore pass freely to channel 217 except during a brief interval when the piston 145 is shifting from one end of its stroke to the other. Channel 217 is permanently connected by suitable piping with a channel 218, Fig. 8, which in the normal or central position of valve 137 is by-passed through a valve groove 219 to a channel 220 connected by piping to a channel 221 which joins another channel 222 leading to any suitable system of lubrication. Thus in the normal central position of valve 137 the fluid supply from channel 132, Fig. 8, has free access to the lubricating supply line 222, except momentarily when the piston 145 is being shifted.

But if the valve 137 is shifted from central position slightly in either direction, as by the dog action previously described, then the by-pass through the valve channel 219 will be temporarily cut off, and relatively high pressure fluid is then available from channel 132 through the channels 194, 193, 192, 191 for effecting the hydraulic reverses, and other control movements previously described.

A high pressure relief valve 223, Fig. 8, consisting of a spring pressed ball 224, provides an outlet for relief of fluid through a channel 225 to channel 222 if the other outlet through channel 194 is momentarily blocked for any reason.

It is, of course, apparent that the release of pressure through valve 137 as just described, does not affect the high pressure available at all times for the shifting of the clutch and brake piston 145, and that for this piston the pressure is increased only during the actual shifting of the piston, which is an extremely brief interval.

It will be noted that the automatic reverse mechanism previously described avoids any necessity for snap-over detents and lost motion shifting devices for the reverser 86. Also that in the shifting of the clutch 83 to effect a change from feed rate to quick traverse rate or vice versa, by reason of the overrunning nature of the connection of the quick traverse train, there is no need for any detent or lost motion devices to throw the clutch mechanism across an intermediate disengaged position, for no such position exists. If the quick traverse train is not engaged then the feed train takes up the driving motion through the over-running clutch device. But it is desirable to provide spring means for engagement of the clutch 83 for dog shifting from feed to quick traverse rate, for the reason that a positive dog shift might break some of the mechanism leading from the table dog to the clutch if it should occur that the complementary clutch teeth abutted at their ends to oppose engagement. Moreover, the clutch 83 should shift quickly past any position of slight engagement where the unit pressure on the clutch faces would be too high. To effect both these results the shifter rod 110 is provided with a conical cam 226, Fig. 4, cooperating with a pair of pivoted spring urged elements 227, 228 arranged for the points of the elements to pass over the points of the cam prior to engagement of clutch 83, whereby to quickly shift the rod 110 and clutch 83 into engaged position and through position of slight clutch engagement.

It will, of course, be clear that any of the described modes of operation of the feed and quick traverse shifter rod 110, either simultaneously with the automatic reversal, or by the dogs 118, 119 unaccompanied by automatic reversal, or manually by the lever 101, will have the same effect so far as concerns the operation of the clutch 12 and brake 40. If the control valve 139 is in automatic spindle stop position the shifting of rod 110 to feed position, by whatever means, will engage the clutch 12, and the shifting of rod 110 to quick traverse position will disengage the clutch 12 and engage the brake 40. And if the control valve 139 is in its other position shifting of the rod 110 will have no effect on the clutch and brake.

What is claimed is:

1. In a milling machine the combination of a rotatable spindle, a work support reciprocable in a path transverse to the spindle axis, a spindle transmission including a shiftable interruptor, a support transmission including reversing means, a feed rate train driven to be interrupted simultaneously with the shifting of said spindle interruptor to interrupting position, and a quick traverse rate train continuously driven irrespective of the position of said interruptor, said trains providing an overrunning device effecting automatic connection of said feed train whenever said quick traverse train is inoperative, and control mechansim for said transmissions including a first manually controlled controller for independent operation of said support reversing means, a second independently operable manually controlled controller for alternative selection of the one or the other train to actuate said support, a third controller manually controlled for shifting said interruptor, dog controlled means operative to shift said reversing means and substantially simultaneously to connect said quick traverse train, and means limiting the operation of said dog controlled means to effect reversal and connection of said quick traverse train in the order recited.

2. In a milling machine the combination of a rotatable spindle, a work support reciprocable in a path transverse to the spindle axis, a spindle transmission including a shiftable interruptor, a support transmission including reversing means, a feed rate train driven to be interrupted simultaneously with the shifting of said spindle interruptor to interrupting position, and a quick traverse rate train continuously driven irrespective of the position of said interruptor, said trains providing an overrunning device effecting automatic connection of said feed train whenever said quick traverse train is inoperative, and control mechanism for said transmissions including a first manually controlled controller for independent operation of said support reversing means, a second independently operable manually controlled controller for alternative selection of the one or the other trains to actuate said support, a third controller manually controlled for shifting said interruptor, power means operable to substantially simultaneously shift said reversing means and connect said quick traverse train to operate said support, a member shiftable for operative connection of said power means, and dog controlled power means for shifting said member, each of said power means being driven to exclude both said interruptor and said feed rate train.

3. In a milling machine the combination of a rotatable spindle, a work support reciprocable in a path transverse to the spindle axis, a spindle transmission including a shiftable interruptor, a support transmission including reversing means, a feed rate train driven to be interrupted simultaneously with the shifting of said spindle interruptor to interrupting position, a quick traverse rate train continuously driven irrespective of the position of said interruptor, said trains providing an overrunning device effecting automatic connection of said feed train whenever said quick traverse train is inoperative, and control mechanism for said transmissions including a first manually controlled controller for independent operation of said support reversing means, a second independently operable manually controlled controller for alternative selection of the one or the other train to actuate said support, a third controller manually controlled for shifting said interruptor, and dog controlled means for substantially simultaneously shifting said reversing means and connecting said quick traverse train and shifting said interruptor in the order recited.

4. In a machine tool the combination of a plurality of relatively movable supports, transmission mechanism for movement thereof alternatively in opposite directions and alternatively at feed or quick traverse rate, control means for said transmission shiftable for effecting a change from one to the other of said directions and substantially simultaneously therewith a change from the one to the other of said rates, a shiftable controller for said control means, a power train for shifting said controller at a rate independent of the rate effected by said control means, and means for connection of said train and controller at a predetermined point in said relative movement.

5. In a machine tool the combination of a plurality of relatively movable supports, transmission mechanism for movement thereof alternatively in opposite directions and alternatively at feed or quick traverse rate, control means for said transmission shiftable for effecting a change from the one to the other of said directions and substantially simultaneously effecting a quick traverse rate in said other direction, a shiftable controller for said control means, piston means for shifting said controller, a pressure fluid supply source for said piston means, valve means for connection of said source and piston means, and means for shifting said valve means at a predetermined point in the relative movement of said supports.

6. In a machine tool the combination of a plurality of relatively movable supports, transmission mechanism for movement thereof in opposite directions and at feed or quick traverse rate, a first controller shiftable for independently effecting a change from the one to the other of said directions, a second controller shiftable for independently effecting a change from the one to the other of said rates, a third controller shiftable for substantially simultaneously effecting a change from the one to the other direction and a quick traverse rate in the last mentioned direction, and dog controlled power means for abruptly shifting said third controller at a rate independent of the rate of said relative movement and at a predetermined point thereof.

7. In a machine tool the combination of a plurality of relatively movable supports, transmission mechanism for movement thereof in opposite directions and at feed or quick traverse rate, a first controller shiftable for independently effecting a change from the one to the other of said directions, a second controller shiftable for independently effecting a change from the one to the other of said rates, a third controller shiftable for substantially simultaneously effecting a change from one to the other direction and a quick traverse rate in the last mentioned direction, fluid operable piston means for shifting said third controller, and a dog controlled valve controlling admission of pressure fluid for operation of said piston means at a predetermined point in said relative movement.

8. In a machine tool the combination of a plurality of relatively movable supports, a transmission for said relative movement including a shiftable reverser clutch means having engaged positions respectively for opposite directions of said relative movement and having a motion interrupting disengaged position, dog controlled means for shifting said reverser comprising a completely mechanical train driven through the reverser for positive adjustment thereof from one of said engaged positions to said interrupting position, and other dog controlled power means driven to exclude said reverser clutch for completing a shifting of the reverser clutch to the other engaged position.

9. In a machine tool the combination of a plurality of relatively movable supports, a transmission for said relative movement including shiftable reverser clutch means having engaged positions respectively for opposite directions of said relative movement and having a motion interrupting disengaged position, and control means for said transmission including dog controlled means driven through said reverser clutch for positive adjustment thereof from one of said engaged positions to said interrupting position, and other dog controlled means for shifting said reverser to the other engaged position including a pump driven to exclude said reverser, a piston connected for shifting of the reverser, and valve means operable during movement of said reverser to disengaged position to connect said pump and piston to continue the reverser movement in the same direction.

10. In a machine tool the combination of a plurality of relatively movable supports, a transmission for said relative movement including a shiftable positive clutch means having engaged positions respectively for opposite directions of said relative movement and having a motion interrupting disengaged position, said transmission also including means for alternative feed or quick traverse rates, dog controlled power means driven through said clutch means for positive adjustment thereof from an engaged position to said motion interrupting position, and dog controlled power means driven to exclude said clutch means for shifting said clutch means to the other engaged position and substantially simultaneously therewith effecting a change from said feed rate to the quick traverse rate.

11. In a machine tool the combination of a plurality of relatively movable supports, a transmission for said relative movement including a shiftable positive clutch means having engaged positions respectively for opposite directions of said relative movement and having a motion interrupting disengaged position, said transmission also including means adjustable for alternative feed or quick traverse rates, dog controlled power means driven through said clutch means for positive adjustment thereof from an engaged position to said motion interrupting position, dog controlled power means driven to exclude said clutch means for substantially simultaneously shifting said clutch means to an engaged position and effecting a change from one to another of said rates, a manually operable controller for shifting said clutch means to effect a change of direction independently of a change in rate, and a second manually operable controller for adjusting said transmission to effect the one or the other rates independently of a change in direction.

12. In a machine tool the combination of a plurality of relatively movable supports, a transmission for said relative movement including a reverser device, power means connectible for operation of said reverser device, a member shiftable for effecting the connection of said power means and device, an initial power means for shifting said member including a dog movable at a rate in accordance with said relative movement, supplemental power means for shifting said member at a relatively rapid rate, and control means operative from said dog for effecting connection of said supplemental power means to continue the shifting of said member.

13. In a machine tool the combination of a transmission mechanism including a member shiftable for altering the transmission effect, a fluid operable shifter for movement of said member, a pressure fluid supply source providing a normal pressure continuously available and connectible for operation of said shifter, control means operable for connection of said source to operate said shifter, and means simultaneously operative with said control means to materially increase the fluid pressure during shifting.

14. In a machine tool the combination of a transmission mechanism including a member shiftable to alternative positions respectively for different transmission effects, a fluid operable shifter for said member, a pressure fluid supply pump connectible for operation of said shifter, a device normally operative to by-pass the fluid delivered by said pump, control means simultaneously operative to connect said source and shifter and to close said by-pass device, and means operative upon completion of the resulting shifter movement to reopen said by-pass device.

15. In a machine tool the combination of a plurality of relatively movable supports, transmission mechanism for said relative movement including elements interengaged for positive drive action and shiftable while under load to alter the transmission effect, a fluid operable shifter for said relative shifting, a power operable pump, a high pressure channel connectible between said pump and shifter, another channel connectible to receive the delivery of said pump at relatively low pressure, control means shiftable for connecting said pump and shifter through said high pressure channel, and means operative simultaneously with said shifting of the control means to close said other channel.

16. In a machine tool having relatively movable supports the combination of transmission mechanism for movement of one of said supports including independently operable reversing and rate change means, a plurality of control devices respectively connected for operation of said reversing and rate change means, said reverser control device including a dog operable pivoted element fixed against axial movement and adjacent said movable support, and said rate change control device including a pivoted element dog operable for axial movement adjacent said movable support and connected for pivotal movement in accordance with the movement of the first mentioned element.

17. In a machine tool having relatively movable supports the combination of transmission mechanism for movement of one of said supports including independently operable reversing and rate change means, a plurality of control devices respectively connected for operation of said reversing and rate change means, said reverser control device including a dog operable pivoted element fixed against axial movement and adjacent said movable support, said rate change control device including a pivoted element dog operable for axial movement and adjacent said movable support and connected for pivotal movement in accordance with the movement of the first mentioned element, and manual control means for the independent operation of the different control devices.

18. In a machine tool having relatively movable supports the combination of transmission mechanism for movement of said supports including independently operable reversing and rate change means, a plurality of control devices respectively connected for operation of said reversing and rate change means, said reverser control device including a dog operable pivoted element fixed against axial movement and adjacent said movable support, said rate change control device including a pivoted element dog operable for axial movement and adjacent said movable support and connected for pivotal movement in accordance with the movement of the first mentioned element, manual control means for the independent operation of the different control devices, and dog controlled power means for operation of said reverser control device and dependently substantially simultaneously effecting operation of said rate change control device.

19. In a machine tool the combination of a rotatable spindle, a reciprocable support, a spindle transmission including an interruptor, a support transmission including reversing means and means for alternative feed or quick traverse rates, a plurality of manually operable controllers respectively for independent operation of said interruptor, of said reversing means and of said alternative feed or quick traverse means, power means for substantially simultaneously operating said reversing means to effect reversal of said support and dependently operating said means for alternative feed or quick traverse rate to effect the quick traverse rate of said support and dependently operating said interruptor to interrupt spindle rotation, and means selectively shiftable to control said power means for alternative operation to exclude operation of said interruptor.

20. In a machine tool the combination of a rotatable spindle, a reciprocable support, a spindle transmission including an interruptor, a support transmission including reversing means and means for alternative feed or quick traverse rates, a plurality of manually operable controllers respectively for independent operation of said interruptor, and of said reversing means and of said alternative feed or quick traverse means, other means for operation of said reversing means, alternative feed or quick traverse means and interruptor, means controlling said other means to effect support reversal, support movement at quick traverse rate and spindle interruption substantially simultaneously in the order last recited, and means selectively shiftable to alter the effect of said controlling means to exclude operation of said interruptor.

21. In a machine tool the combination of a rotatable spindle, a reciprocable support, a spindle transmission including an interruptor, a support transmission including reversing means and means for alternative feed or quick traverse rates, a plurality of manually operable controllers respectively for independent operation of said interruptor, of said reversing means and of said alternative feed or quick traverse means, said interruptor controller including a shiftable hand lever having alternative spindle drive and spindle stop positions, and means for operation of said interruptor in accordance with the operation of said feed and quick traverse controller while said shiftable hand lever remains in said spindle drive position.

22. In a machine tool the combination of a rotatable spindle, a reciprocable support, a spindle transmission including an interruptor, a support transmission including reversing means and means for alternative feed or quick traverse rates, a plurality of manually operable controllers respectively for independent operation of said interruptor, of said reversing means and of said alternative feed or quick traverse means, said interruptor controller including a shiftable hand lever having alternative spindle drive and spindle stop positions, means for operation of said interruptor in accordance with the operation of said feed and quick traverse controller while said shiftable hand lever remains in said spindle drive position, and a controller adjustable for nonoperative adjustment of the last mentioned means.

23. In a machine tool having a rotatable spindle and a reciprocable support, the combination of a spindle transmission including means shiftable for alternatively establishing or interrupting spindle rotation, a support transmission including reversing means and means for alternatively effecting a feed rate or a relatively fast quick traverse rate, a plurality of independently operable controllers respectively for effecting alternative reversal or interruption of said support and for effecting different of said rates, and other control means for substantially simultaneously reversing said support, changing the rate thereof and shifting said shiftable means, said other control means being selectively adjustable to exclude the shifting of said shiftable means.

24. In a milling machine having a rotatable spindle and a work support reciprocable in a path transverse to the axis of said spindle, the combination of a spindle transmission including means shiftable for alternatively establishing or interrupting spindle rotation, a support transmission including reversing and interrupting means and means for alternatively effecting a feed rate or a relatively fast quick traverse rate, a plurality of controllers respectively for independently effecting alternative reversal or interruption of said support and for effecting different of said rates, and other control means for substantially simultaneously reversing said support, changing the rate thereof and shifting said shiftable means and including means limiting the order thereof to the order recited, said other control means being selectively adjustable to exclude the shifting of said shiftable means.

25. In a machine tool the combination of a reciprocable support, a transmission therefor including shiftable reversing means and means shiftable for alternatively effecting a feed rate or a relatively fast quick traverse rate, a trip device including dog operable trip elements pivoted on a common axis adjacent a longitudinal edge of said support, one of said elements being axially movable to shift said alternative feed or quick traverse means, one of said elements being connected for the pivotal movement thereof to shift said reversing means, and other means for shifting said reversing means to effect reversal including a dog operable trip element adjacent to and spaced from said axis in the direction of the path of support movement.

26. In a machine tool the combination of a reciprocable support, a transmission therefor including shiftable reversing means and means shiftable for alternatively effecting a feed rate or a relatively fast quick traverse rate, a trip device including dog operable trip elements pivoted on a common axis adjacent a longitudinal edge of said support, one of said elements being axially movable to shift said alternative feed or quick traverse means, one of said elements being connected for the pivotal movement thereof to shift said reversing means independently of said feed or quick traverse means, and other trip means including a dog operable trip element adjacent to and spaced from said axis in the direction of support movement and means operable from the last mentioned trip element for shifting said reversing means and substantially simultaneously dependently shifting said alternative feed or quick traverse means to effect said quick traverse rate.

27. In a machine tool the combination of a rotatable spindle and a reciprocatory support, a transmission for said spindle including a shiftable interruptor, a transmission for said support including shiftable reversing means and means shiftable for alternative feed or quick traverse rate, a hand grip mounted for manual movement in a plurality of mutually transverse paths, a dog operable element adjacent said support, means operative from movement of said element for substantially simultaneously shifting said interruptor, said reversing means and said alternative feed or quick traverse means, and connections from said hand grip effective upon movement in the one path to independently shift said reversing means and upon movement in the other path to independently shift said alternative feed or quick traverse means.

WALTER M. POHL.
FRED A. PARSONS.